United States Patent
Rhee et al.

(10) Patent No.: US 9,971,895 B2
(45) Date of Patent: May 15, 2018

(54) METHOD AND APPARATUS FOR SUPPORTING DYNAMIC CHANGE OF AUTHENTICATION MEANS SECURE BOOTING

(71) Applicant: Samsung Electronics Co., Ltd., Suwon-si, Gyeonggi-do (KR)

(72) Inventors: Injong Rhee, Seongnam-si (KR); Peng Ning, Richarson, TX (US); Youngkyoo Kim, Seoul (KR); Youngjip Kim, Suwon-si (KR); Dongho Jang, Hwaseong-si (KR); Siejoon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 14/138,810

(22) Filed: Dec. 23, 2013

(65) Prior Publication Data

US 2014/0181498 A1    Jun. 26, 2014

(30) Foreign Application Priority Data

Dec. 22, 2012  (KR) .................. 10-2012-0151590
Apr. 24, 2013  (KR) .................. 10-2013-0045350

(51) Int. Cl.
*H04L 29/06* (2006.01)
*G06F 21/57* (2013.01)
*G06F 21/64* (2013.01)
*H04W 88/02* (2009.01)

(52) U.S. Cl.
CPC ............ *G06F 21/575* (2013.01); *G06F 21/57* (2013.01); *G06F 21/64* (2013.01); *H04W 88/02* (2013.01)

(58) Field of Classification Search
CPC ....... G06F 21/575; G06F 21/57; G06F 21/572
See application file for complete search history.

(56) References Cited

U.S. PATENT DOCUMENTS

| | | | |
|---|---|---|---|
| 6,535,974 B1 | 3/2003 | Chang et al. | |
| 6,560,706 B1 * | 5/2003 | Carbajal | G06F 21/572 |
| | | | 713/155 |
| 8,474,698 B1 * | 7/2013 | Billett | G06F 21/57 |
| | | | 235/379 |
| 2004/0193873 A1 * | 9/2004 | England | G06F 9/4416 |
| | | | 713/156 |
| 2006/0107071 A1 | 5/2006 | Girish et al. | |
| 2007/0079112 A1 | 4/2007 | Lewis et al. | |

(Continued)

FOREIGN PATENT DOCUMENTS

WO    00/72149 A1    11/2000

*Primary Examiner* — Jason K Gee
(74) *Attorney, Agent, or Firm* — Jefferson IP Law, LLP

(57) ABSTRACT

A method for supporting change of the authentication means for secure booting with the change of the trust root (root of trust) of the readymade electronic device and the electronic device therefor is provided. The secure boot generation method of an electronic device of the present disclosure includes storing plural initial certificates including a first initial certificate and a second initial certificate, designating the first initial certificate as a root certificate for secure booting of the electronic device, and switching the initial certificate from the first initial certificate to the second initial certificate in response to a request. Various other embodiments are possible.

16 Claims, 9 Drawing Sheets

(56) References Cited

U.S. PATENT DOCUMENTS

| | | | |
|---|---|---|---|
| 2007/0192610 A1* | 8/2007 | Chun | G06F 21/64 713/176 |
| 2007/0277038 A1 | 11/2007 | Hardy et al. | |
| 2008/0256360 A1 | 10/2008 | Guzman et al. | |
| 2009/0193211 A1 | 7/2009 | Hu et al. | |
| 2012/0216283 A1 | 8/2012 | Endler et al. | |

* cited by examiner

METHOD AND APPARATUS FOR SUPPORTING DYNAMIC CHANGE OF AUTHENTICATION MEANS SECURE BOOTING

CROSS-REFERENCE TO RELATED APPLICATION(S)

This application claims the benefit under 35 U.S.C. 119(a) of Korean patent applications filed on Dec. 22, 2012 and Apr. 24, 2013 in the Korean Intellectual Property Office and assigned Serial Nos. 10-2012-0151590 and 10-2013-0045350 respectively, the entire disclosure of each of which is hereby incorporated by reference.

TECHNICAL FIELD

The present disclosure relates to a method for supporting change of authentication means for secure booting. More particularly, the present disclosure relates to a method for supporting change of the authentication means for secure booting with a change of the trust root (root of trust) of an electronic device.

BACKGROUND

With the increasing popularity of mobile devices like smartphones and the diversification of application programs, the mobile device usage environment is becoming similar to that of the personal computer.

In this respect, the potential damage caused by malicious code has increased dramatically.

With the diversification of application fields requiring high security levels, like electronic payment, the interest and requirements of security in smartphones increases.

Particularly, open source platforms such as the Android Operating System (OS) are vulnerable to external attacks and malicious applications distributed through low-security application stores. Many sensitive private information leakage accidents are caused due to illegal acquisition of the trust root information of the platform.

Because such security vulnerability hampers the widespread use of the smart devices in public fields requiring high security levels, much research is being conducted to reinforce mobile OS security and recent System on Chip (SoC) technology supports secure booting based on digital certificates and digital signatures in the booting process.

The recent SoC technology guarantees basic security in the form of a secure boot chain in the booting process.

In order to accomplish this aim, a related technology has been disclosed in Korean patent Laid-open No. 10-2002-0092222 (title of disclosure: Secure Booting and Secure Boot Image Generation Method) which proposes a secure booting method for protecting from the booting with unauthenticated boot image. However, there exists a need for an improved apparatus and method for supporting a change of authentication means for secure booting.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for switching the trust root of a readymade Business-to-Consumer (B2C) mode electronic device to Business-to-Business (B2B) or Business-to-Government (B2G) mode trust root.

Another aspect of the present disclosure is to provide a method and apparatus for use of an electronic device distinctively in function or security level according to the initial certificate by configuring the boot loaders or boot images corresponding to plural distinct initial certificates to be dedicated to distinct functions or distinct security levels.

In accordance with an aspect of the present disclosure, a method for generating a secure boot for an electronic device is provided. The method includes storing plural initial certificates including a first initial certificate and a second initial certificate, designating the first initial certificate as a root certificate for secure booting of the electronic device, and switching the initial certificate from the first initial certificate to the second initial certificate in response to a request.

In accordance with another aspect of the present disclosure, an electronic device is provided. The electronic device includes a first memory configured to store a plurality of initial certificates including a first initial certificate and a second initial certificate, a second memory configured to store a certificate selection information indicating a selected certificate selected among the first and second initial certificates, and at least one processor configured to execute a verification module to verify a boot image of the electronic device using the selected certificate.

In accordance with another aspect of the present disclosure, a storage medium that stores commands is provided. The storage medium stores commands configured to perform, when the commands are processed by at least one processor, at least one operation including storing plural initial certificates that include a first initial certificate and a second initial certificate, designating the first initial certificate as a root certificate for secure booting of the electronic device, and switching the initial certificate from the first initial certificate to the second initial certificate in response to a request.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
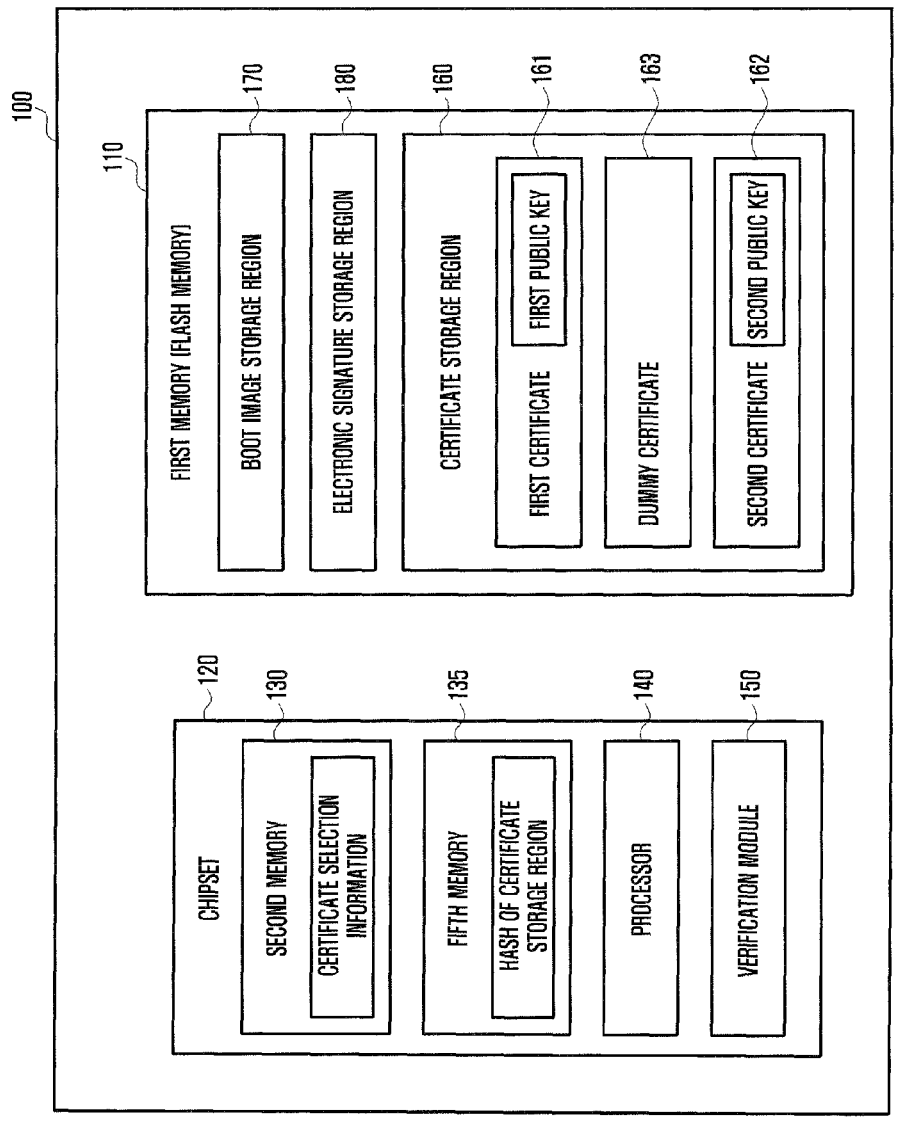
FIG. 1 is a block diagram illustrating a configuration of an electronic device for changing an initial certificate for secure booting dynamically according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, throughout the specification, when it is described that a part is "connected to" another part, this includes not only a case of "being directly connected to" but also a case of "being indirectly connected to" in which another device is interposed there between. Also, when it is described that a component "includes" another component, this does not means the exclusion of other components unless otherwise stated specifically.

An electronic device according to an embodiment of the present disclosure can be any type of information communication device and multimedia device including a tablet PC, a mobile communication device, a mobile phone, a Personal Digital Assistant (PDA), a smartphone, an International Mobile Telecommunication 2000 (IMT-2000) terminal, a Code Division Multiple Access (CDMA) terminal, a Wideband CDMA (WCDMA) terminal, a Global System for Mobile communication (GSM) terminal, a General Packet Radio Service (GPRS) terminal, an Enhanced Data GSM Environment (EDGE) terminal, a Universal Mobile Telecommunication Service (UMTS) terminal, a Digital Broadcast terminal, an Automated Teller Machine (ATM) terminal, etc.

The electronic device may include at least one of a digital broadcast module for receiving digital broadcast (e.g. Digital Multimedia Broadcasting (DMB) and Digital Video Broadcasting (DVB), a camera module for shooting still and motion images of a subject, a short range communication module for supporting at least one of Bluetooth, Infrared Data Association (IrDA), Radio Frequency Identification (RFID), and Near Field Communication (NFC), a hard key-based input unit, a Radio Frequency (RF) module for supporting voice communication, video conference, and data communication, an Internet access module for supporting Internet Protocol (IP) based communication service, a battery for supplying power to the above components, and other components although they are not depicted or described herein.

Although there is a little difference, chip manufacturers typically design chips to operate with the common principle of secure boot chain in the booting process as follows. A boot code is composed of at least two individual codes and the first ROM memory boot code of them is stored in the ROM memory. This cannot be modified or substituted in any aspect. For example, when the electronic device powers on, the processor executes the boot code stored in the ROM memory and the second boot code subsequently. The second boot code is the manufacturer (OEM) custom boot code which is written in the rewritable ROM memory such as flash memory in order for the manufacturing facility to write in the memory region during the manufacturing process.

The ROM boot code is embedded persistently by the chip manufacturer while the OEM boot code can be replaced by the manufacturer in the manufacturing line using a flash write apparatus or engineering downloader. Accordingly, it may incur security vulnerability and it is necessary to check whether the ROM boot code is genuine or modified.

In embodiments of the present disclosure, an electronic signature is generated by signing with a hash value of an execution image (binary or boot image) of an electronic device as a public key and stored in the rewritable flash memory region along with the execution image. The certificate is also stored in the flash memory region, and the hash value is calculated using the public key included in the certificate and the electronic signature for use in checking whether it is altered based on whether the hash values match or not. Here, it is also possible to store only the public key in the flash memory region with the exception of the certificate.

In order to verify the certificate or the public key, the hash value of the certificate is fused at a One Time Programmable (OTP) region such that the fused hash value is compared with the current hash value in the booting process. Since the hash value is at the beginning of the trusted chain (chain of trust), it is referred to as trust root.

According to an embodiment of the present disclosure, the hash value of the certificate can be fused in the ROM memory. In order to guarantee the security of the public key, the SoC acquires the hash value of the public key from the manufacturer through a secure channel and fuses the hash value in the SoC manufacturing process (in the factory).

In such a method, the flexibility may drop in the situation requiring change of the trust root.

According to an embodiment of the present disclosure, the trust root of the readymade electronic device operating in the Business-to-Consumer (B2C) mode can be switched to a Business-to-Business (B2B) or Business-to-Government (B2G) mode trust root.

According to an embodiment of the present disclosure, it is possible to change the manufacturer authentication means as the authentication means used as default in the secure booting of the electronic device for an OEM authentication means fabricated by a preliminary purchasing organization afterward.

According to an embodiment of the present disclosure, the distinct boot loaders or boot images corresponding to plural distinct initial certificates are configured to be dedicated to distinct functions or distinct security levels such that the electronic device can be used distinctively in function or security level according to the initial certification.

FIG. 1 is a block diagram illustrating a configuration of an electronic device for changing an initial certificate for secure booting dynamically according to an embodiment of the present disclosure.

Referring to FIG. 1, the electronic device 100 according to an embodiment of the present disclosure includes a first memory 110 and a chipset 120.

The first memory 110 includes a certificate storage region 160 for storing plural initial certificates including the first certificate 161 and the second certificate 162. Here, the certificate storage region 160 may be configured as a region for storing public keys instead of the plural certificates but not limited thereto.

The first memory 110 may be a non-volatile memory capable of being connected to the chipset 120 mounted in the electronic device.

The certificate storage region 160 includes at least one of the first initial certificate 161, the second initial certificate 162, and the dummy certificate 163.

The first and second initial certificates 161 and 162 may include corresponding public keys respectively.

The dummy certificate 163 does not include any information for use in authentication and may be the data padding a unit region reserved for storing an initial certificate.

The first memory 110 includes a boot image storage region 170 and an electronic signature storage region 180.

The boot image storage region 170 stores boot images. One of the boot images may be executed when the electronic device 100 powers on or restarts.

The electronic signature storage unit 180 may store the electronic signature of the boot image. For example, the electronic signature of the boot image may be generated by signing the original boot image or contracted message of the original boot image (e.g. hash value) with a private key corresponding to the public key of the initial certificate for the secure booting.

The first memory 110 stores at least one boot loader which is composed of plural initial certificates, boot images, and electronic signatures. In the case that plural boot loaders are stored in the first memory 110, the certificate storage region 160, boot image storage region 170, or electronic signature storage region 180 are assigned per boot loader.

The chipset 120 includes the second memory 130 and the processor 140. The chipset 120 may be any of a Central Processing Unit (CPU), a Graphic Processing Unit (GPU), a Micro Control Unit (MCU) or a similar device. The chipset 120 is also capable of working as an Application Processor (AP), a Communication Processor (CP), and a Multimedia Processor.

The second memory 130 includes the certificate selection information indicating one of plural initial certificates including the first and second initial certificates. For example, the certificate selection information indicates the initial certificate for use in security authentication of the electronic device 100. For example, the second memory 130 may be OTP memory (e.g. fuse area of the chipset) for the certificate selection information.

The processor 140 is capable of executing the authentication module 150 for security booting to be performed when the electronic device 100 powers on or restarts.

The authentication module 150 may be configured to authenticate the boot image of the electronic device 100 using the initial certificate indicated by the certificate selection information. For example, the boot image may be stored in the boot image storage region 170 of the first memory 110 or a separate storage medium (not shown) instead of the first memory. For example, the separate storage medium may be embedded in the electronic device or connected through an external connection link.

The chipset 120 includes the fifth memory 135 as an additional component, and the fifth memory 135 stores a hash value of the certificate storage region 160. The fifth memory 130 may be a non-volatile memory embedded in the chipset.

For example, in the case that the hash value of the certificate storage region 160 is stored in the fifth memory 135 already, the authentication module 150 calculates the hash value of the certificate storage region 160 at the authentication execution timing, and compares the calculated hash value with the hash value stored previously in the fifth memory 135. As a result of the comparison, if the calculated hash value and the hash value stored in the fifth memory 135 match each other, it can be determined that the certificate storage region 160 is not altered illegally such that the integrity of the plural initial certificates stored in the certificate storage region 160 is verified.

The fifth memory 135 may further store the code of the initial boot loader.

According to an embodiment of the present disclosure, the fifth memory 135 may be formed with at least a part of the second memory 130 (e.g. the second memory may store at least one of the certificate selection information, the hash value of the certificate storage region, and the code of the initial boot loader).

The second memory 130 or the fifth memory 135 may be divided into at least two sub-memory regions according to the type of the information/code stored therein.

According to an embodiment of the present disclosure, each of the first, second, and fifth memories may be a non-volatile memory like OTP memory, mask Read Only Memory (ROM), Programmable Read Only Memory (PROM), Erasable and Programmable Read Only Memory (EPROM), Electrically Erasable and Programmable Read Only Memory (EEPROM), and flash memory.

Figure 2:
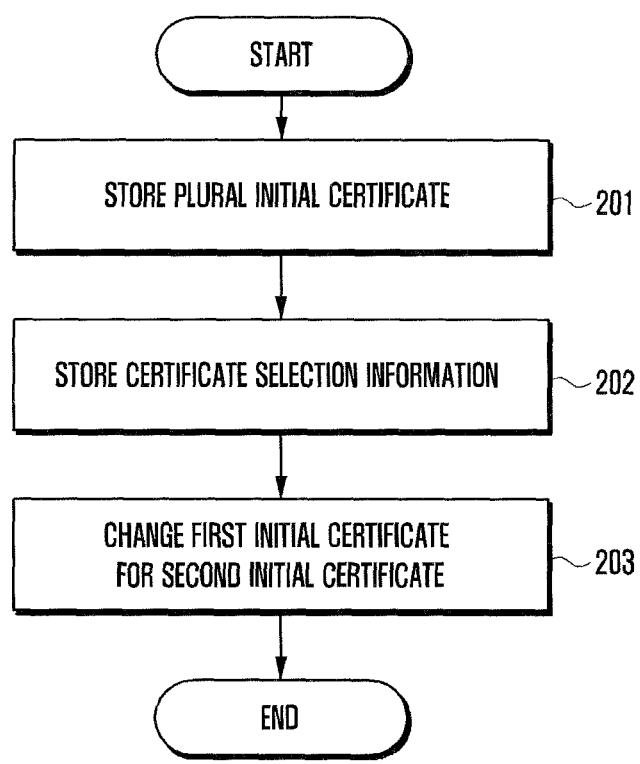
FIG. 2 is a flowchart illustrating a method for generating a security boot for an electronic device according to an embodiment of the present disclosure.

FIG. 2 is a flowchart illustrating a method for generating a security boot for an electronic device according to an embodiment of the present disclosure.

Referring to FIG. 2, the electronic device is in a state of storing in which it stores plural initial certificates including the first and second initial certificates at operation 201.

The electronic device designates the first initial certificate as the initial certificate (root) certificate for secure booting of the electronic device at operation 202. For example, the electronic device is capable of storing the certificate selection information indicating the first initial certificate.

For example, the certificate selection information indicating the initial certificate may be stored in a certain region such as a fuse region of the chipset or header of the boot image of the electronic device. According to an embodiment of the present disclosure, the certificate selection information can be the address information on the first initial certificate or the address information on the second initial certificate but is not limited thereto.

Operations 201 and 202 can be performed simultaneously or sequentially in the order of operations 201 and 202 or 202 and 201. The execution order of these operations is not limited in an embodiment of the present disclosure.

The first initial certificate for secure booting of the electronic device may be switched to the second initial certificate in response to a user request at operation 203.

For example, operation 203 may include the operation of replacing the address information of the first initial certificate with the address information of the second initial certificate in the certificate selection information stored in a predetermined region.

In the case that the electronic signature corresponding to the first initial certificate is stored in the electronic device, operation 203 may include the operation of replacing the electronic signature corresponding to the first initial certificate with the electronic signature corresponding to the second initial certificate.

For example, the electronic signature corresponding to the first initial certificate can be generated by signing the original boot image or a contracted version of the boot image with the private key corresponding to the public key of the first initial certificate. The electronic signature generated in this way can be un-signed with the public key of the first initial certificate to verify the original or contracted version of the boot image.

The electronic signature corresponding to the second initial certificate can be generated by signing the original version or contracted version of the boot image with the private key corresponding to the public key of the second initial certificate. The electronic signature generated in this way can be un-signed with the public key of the second initial certificate to verify the original or contracted version of the boot image.

The boot image to be signed in correspondence to the first initial certificate and the boot image to be signed in correspondence to the second initial certificate may be identical with or different from each other.

For example, operation 203 can be performed in response to a request for changing the pre-designated initial certificate for another initial certificate.

According to an embodiment of the present disclosure, if the first initial certificate is designated as the initial certificate, additional certificates for securing booting (e.g. issuance organization certificate (CA Attestation Certificate) and boot image certificate (Attestation Certificate)) in addition to the first initial certificate.

Figure 3:
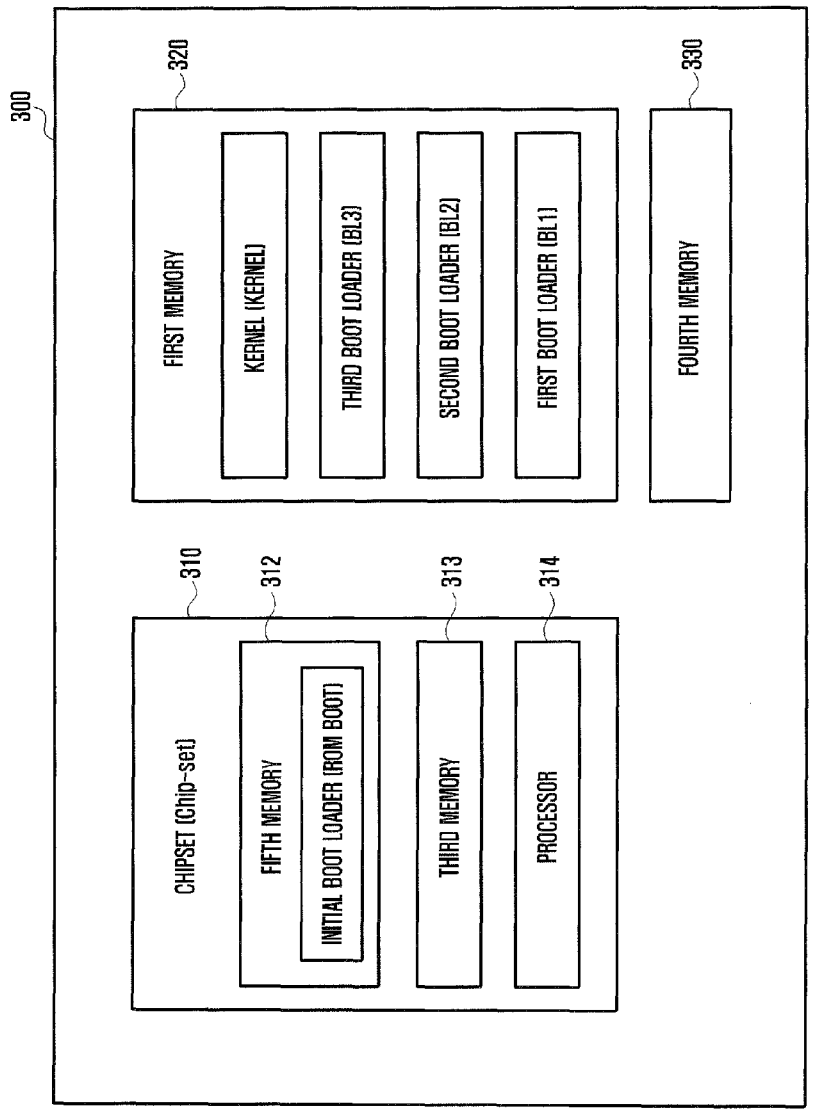
FIG. 3 is a block diagram illustrating a configuration of an electronic device for performing secure booting according to another embodiment of the present disclosure.

FIG. 3 is a block diagram illustrating a configuration of an electronic device for performing secure booting according to embodiment of the present disclosure.

Referring to FIG. 3, the electronic device 300 according to an embodiment of the present disclosure includes a chipset 310, a first memory 320, and a fourth memory 330.

The chipset 310 includes a processor 314, a second memory 312, and a third memory 313. It is obvious that the chipset 310 may further include a memory controller and additional memories.

The first memory 320 may include at least one boot loader or kernel. The boot loader and kernel may be software source codes.

According to the embodiment of FIG. 3, the first memory 320 includes three boot loaders (i.e. the first boot loader (BL1), the second boot loader (BL2), and the third boot loader (BL3)) and the kernel. This is just an embodiment, and the present disclosure is not limited to the number of boot loaders.

In the case that plural boot loaders are included in the first memory 320, each boot loader may operate the next boot loader.

The fifth memory 312 is a non-volatile memory in the chipset and may store the initial boot loader (ROM BOOT) executed when the system powers on.

The third memory 313 is a volatile memory in the chipset and provides a space for loading and executing the code of at least a part of the initial boot loader stored in the second memory or the boot loader stored in the first memory 320 dynamically.

The fourth memory 330 is a volatile memory outside of the chipset and may provide a space for loading and executing at least a part of the code of the boot loader or kernel stored in the first memory dynamically. For example, the fourth memory 330 may have greater capacity than the third memory 313 and, in this case, the code that is relatively small among the boot loads is loaded on the third memory 313 and the code that is relative large on the fourth memory 330, however, this is just an embodiment and the present disclosure is not limited to the capacities of the third memory 313 and the fourth memory 330. For example, each of the third and fourth memory may be a volatile memory such as Dynamic Random Access Memory (DRAM), Static Random Access Memory (SRAM), and Synchronous Dynamic Random Access Memory (SDRAM).

For example, if the electronic device powers on, the initial boot loader (ROM BOOT) is loaded on the third memory 313 and executed by the processor.

If the initial boot loader (ROM BOOT) is executed, the processor 314 detects the first memory 320, initializes the first memory 320, loads the first boot loader (BL1) stored in the first memory 320 to the third memory 313, verifies the first boot loader (BL1), and executes, if the verification is successful, the verified first boot loader (BL1).

If the first boot loader (BL1) is executed, the processor 314 verifies the second boot loader (BL2) and, if the verification is successful, executes the second boot loader (BL2).

If the second boot loader (BL2) is executed, the processor 314 detects the fourth memory 330, initializes the fourth memory 330, loads the third boot loader (BL3) on the initialized fourth memory 330, verifies the third boot loader (BL3), and executes, if the verification is successful, the third boot loader (BL3).

If the third boot loader (BL3) is executed, the processor 314 loads the kernel on the fourth memory 330 to execute the kernel for initial booting. The third boot loader (BL3) is configured to verify the kernel loaded on the fourth memory 330 and execute, only when the verification is successfully, the kernel (open source kernel booting) or configured to execute the kernel loaded on the fourth memory 330 without verifying the kernel (close source kernel booting).

According to an embodiment of the present disclosure, the secure booting of the electronic device is performed in the order of the initial boot loader (ROM BOOT), the first boot loader (BL1), the second boot loader (BL2), the third boot loader (BL3), and the kernel, however, the present disclosure is not limited to the execution order, number, or type of the boot loaders. According to an embodiment of the present disclosure, the first memory 320 may store plural boot loaders but the present disclosure can be implemented with only one boot loader stored in the first memory 320.

Figure 4:
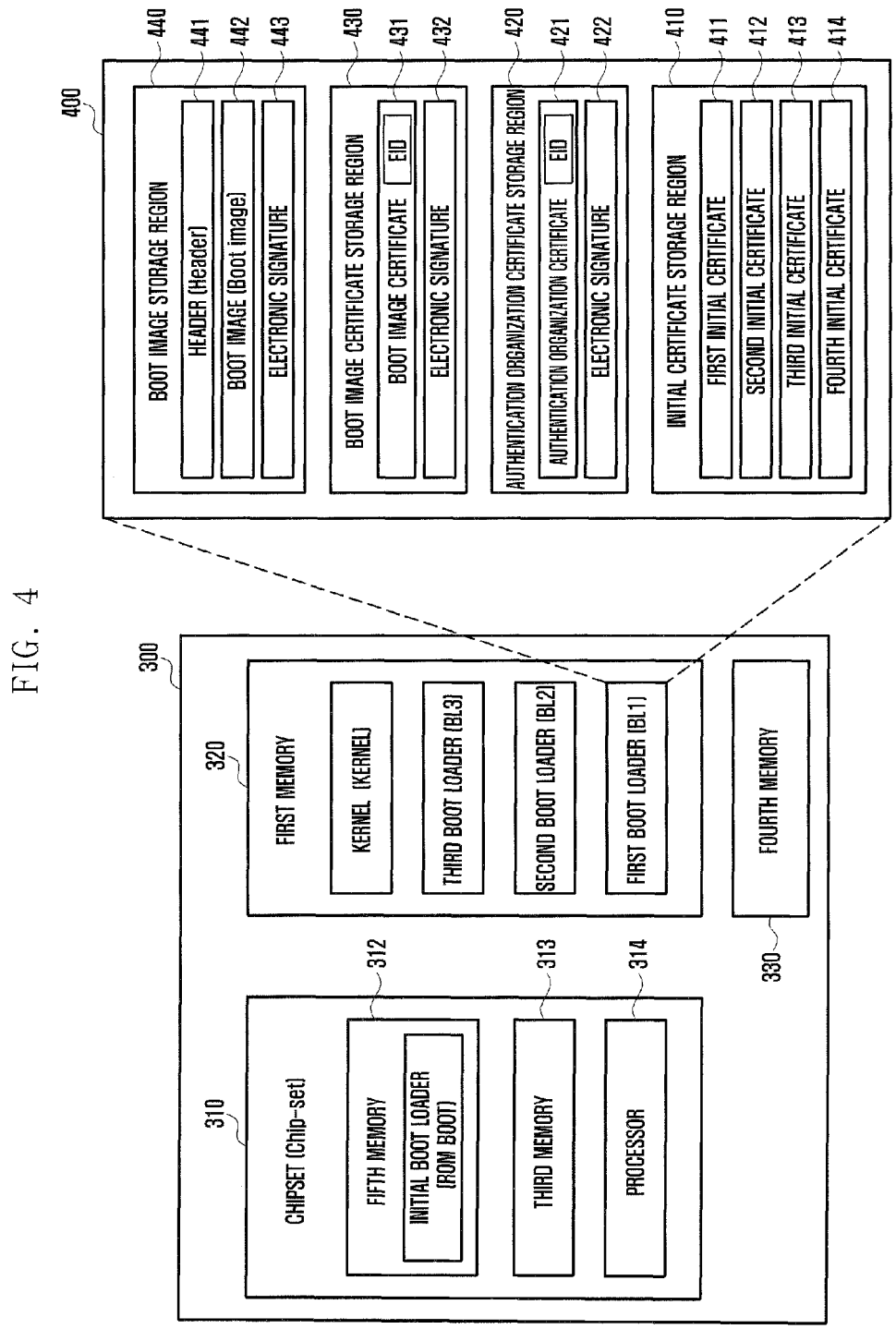
FIG. 4 is a block diagram illustrating a configuration of a boot loader for securing booting of an electronic device according to an embodiment of the present disclosure.

FIG. 4 is a block diagram illustrating a configuration of a boot loader for securing booting of an electronic device according to an embodiment of the present disclosure. According to an embodiment of the present disclosure, the boot loader may be any of the first boot loader (BL1), the second boot loader (BL2), the third boot loader (BL3).

Referring to FIG. 4, the boot loader 400 includes an initial certificate storage region 410, an authentication organization certificate storage region 420, a boot image certificate storage region 430, and a boot image storage region 440.

The initial certificate storage region 410 may store at least one initial certificate for use in secure booting.

In the case that plural initial certificates including the first and second initial certificates 411 and 412 are stored in the initial certificate storage region 410, it is possible to switch the initial certificate for use in verifying the boot loader from the first initial certificate 411 to the second initial certificate 412 and, even after being sold, the initial certificate can be changed.

Although this embodiment of the present disclosure is directed to a case where the initial certificate storage region 410 stores the first to fourth initial certificates 411 to 414, the present disclosure is not limited to the number and storage type of the initial certificates. The initial certificates stored in the initial certificate storage region 410 may include respective public keys.

Also, the initial certificate storage region 410 may store a dummy certificate instead of the initial certificate. The dummy certificate may indicate the data padding a unit region reserved for storing an initial certificate in the initial certificate storage region 410 without inclusion of the actual information for use in verification such as a public key.

The first to fourth initial certificates 411 to 414 may correspond to at least one candidate user (e.g. B2B or B2G client) and manufacturer.

For example, the initial certificate storage region 410 may store the verification information including public keys corresponding to the candidate B2B clients or the plural initial certificates having different public keys corresponding to the same candidate B2B client.

According to another embodiment of the present disclosure, the first initial certificate 411 may include the public key of the manufacturer of the electronic device, and the second initial certificate 412 may include the public key of the user (purchaser). Also, the first initial certificate 411 may include the first public key of the electronic device manufacturer, and the second initial certificate 412 may include the second public key of the same electronic device manufacturer as the first initial certificate 411.

The boot image corresponding to the first initial certificate 411 and the boot image corresponding to the second initial certificate 412 are identical with or different from each other. Whether to perform verification on the kernel is determined per boot image in the booting process after loading the kernel.

The initial certificate can be changed after the electronic device has been sold.

The boot image certificate storage region 430 may store the boot image certificate (attestation certificate) 431.

The boot image certificate 431 is the certificate for verifying the integrity of the boot image 442 and includes information fields containing supplementary information on the boot image 442. The boot image certificate storage region 430 may further store the electronic signature 432 obtained by signing the boot image certificate 431 with the private key corresponding to the public key of the initial certificate. According to an embodiment of the present disclosure, the boot image certificate 431 may further include a field (e.g. EID) related to the information for identifying the user.

The authentication organization certificate storage region 420 may store the authentication organization certificate (attestation CA certificate) 421.

The authentication organization certificate 421 is the certificate for authenticating whether the boot image certificate is issued by an authorized authentication organization and may include the supplementary information on the authentication organization. The authentication organization certificate storage region 420 may further store the electronic signature 422 acquired by signing the authentication organization certificate 421 with the private key corresponding to the initial certificate. Depending on the implementation, the authentication organization certificate 421 may further include a field (related to the information for identifying the user (e.g. EID)).

The boot image storage region 440 may further include a boot image header 411, a boot image 422, and an electronic signature 433 of the boot image.

The boot image 442 may include a source code configured for initializing at least one device embedded in the electronic device or connected from outside, a source code configured to load the next boot loader or kernel on the internal or external volatile memory of the electronic device, and a code configured for verifying the next boot loader or kernel. The electronic signature 443 of the boot image can be generated by signing the original version or contracted version (e.g. hash value) of the boot image 442 with the private key corresponding to the public key of the initial certificate. Here, the private key may be owned by the user (purchaser) or manufacturer.

Figure 5:
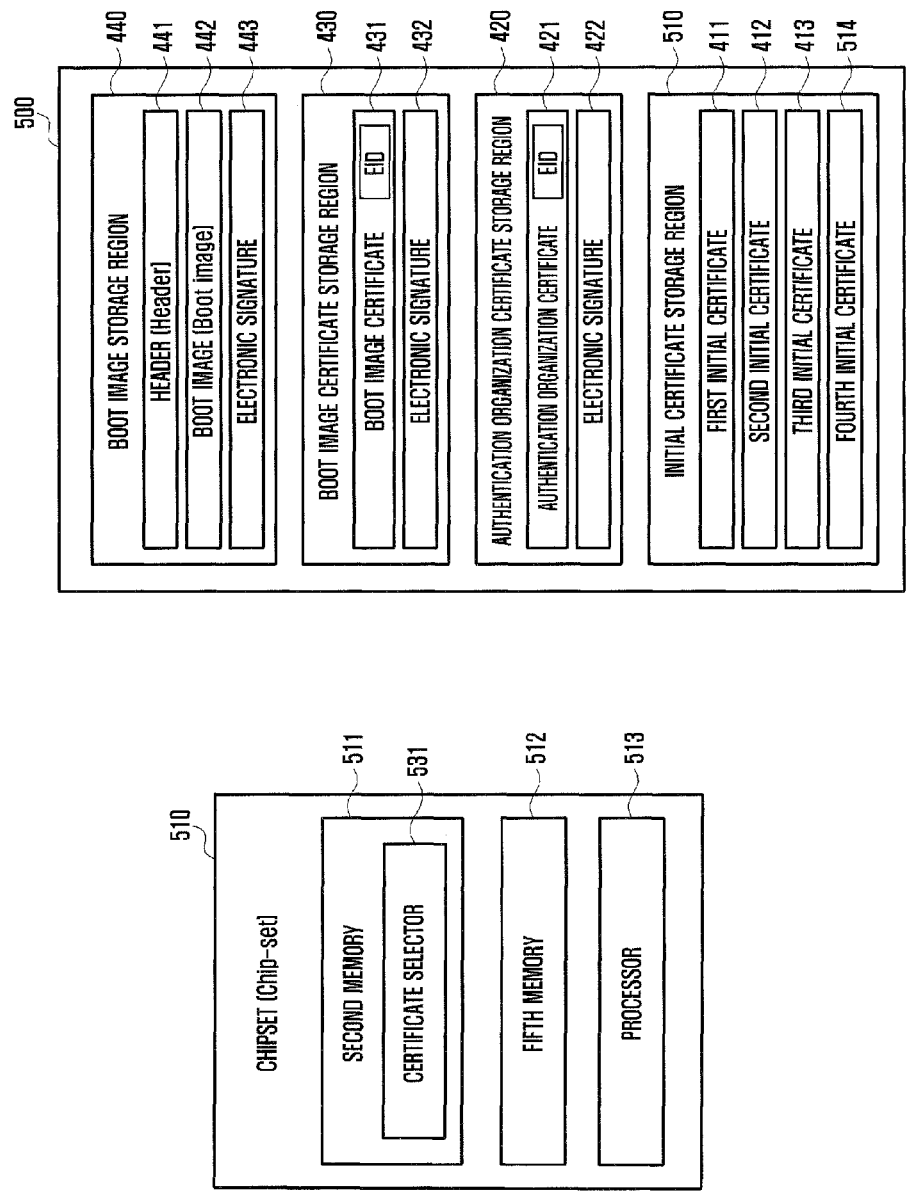
FIG. 5 is a block diagram illustrating a configuration of a boot loader of an electronic device according to an embodiment of the present disclosure.

Referring to FIG. 5, the electronic device according to an embodiment of the present disclosure includes a chipset 510 and a memory 500.

The first memory 500 may store at least one boot loader 400 which is substantially identical with the boot loader 400 of FIG. 4 in configuration.

The chipset 510 includes a second memory 511, a fifth memory 512, and a processor 513 that match the second memory 130, the fifth memory 135, and the processor 140 of the chipset 120 depicted in FIG. 1.

The second memory 511 may be implemented with a memory programmable at least once and include a certificate selector 521 at a part thereof. The second memory 511 may be a fuse area of the chipset.

The certificate selector 531 may store the certificate selection information indicating an initial certificate selected among plural certificates 411 to 414 stored in the initial certificate storage region 410. For example, the certificate selection information may be the memory address information at which the initial certificate is stored on the boot loader 400.

Depending on the implementation, the certificate selection information indicating the initial certificate selected among the plural initial certificates in a region (e.g. header 441) of the boot image of the first memory as well as the certificate selector 531 of the second memory 511.

Depending on the implementation, an additional field related to the information for identifying the user (e.g. EID) is provided at least one of the second memory 511, the boot image certificate 431 of the first memory 500, and the authentication organization certificate 421 of the first memory 500.

The fifth memory 512 is a non-volatile memory embedded in the chipset and capable of storing initial hash value of the entire initial certificate storage region 410 of the first memory. The initial hash value is the hash value pre-calculated for the initial certificate storage region 410 of the first memory at the chip manufacturing phase and may be stored in the non-volatile memory in the chipset for verifying the integrity of the initial certificate storage region at the initial certificate change timing afterward.

A description is made of a secure booting of an electronic device according to an embodiment of the present disclosure hereinafter.

Figure 6:
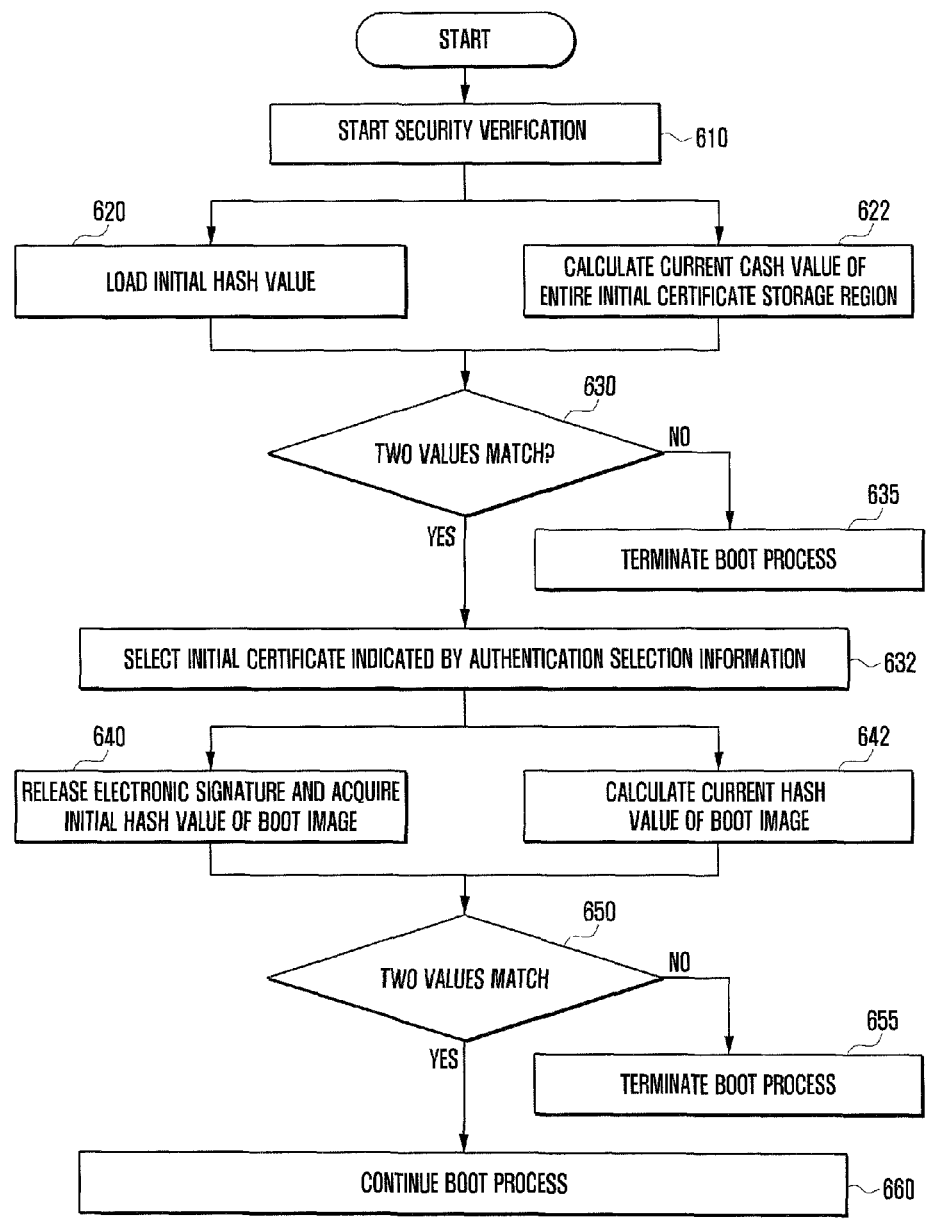
FIG. 6 is a flowchart illustrating a secure booting method according to an embodiment of the present disclosure.

FIG. 6 is a flowchart illustrating a secure booting method according to an embodiment of the present disclosure.

Referring to FIG. 6, the secure booting method according to an embodiment of the present disclosure includes first security verification and second security verification.

The processor loads a boot loader including a boot image on an internal or external volatile memory and starts security verification to the loaded boot loader at operation 610.

The processor is capable of loading an initial hash value stored in the fifth memory at operation 620. The processor is capable of calculating the current hash value of the entire initial certificate storage region of the first memory.

The processor compares the initial hash value loaded at operation 620 and the current hash value calculated at operation 622 to determine whether the hash values match each other at operation 630. If it is determined that the reference and current hash values do not match, the processor determines that the initial certificate storage region of the first memory has been altered and thus terminates the booting process of the electronic device at operation 635.

If it is determined that the initial hash value and the current hash value match at operation 630, the processor determines that the integrity of the initial certificate storage region of the first memory is verified successfully. This means that the code and data stored in the initial certificate storage region of the first memory is not altered, replaced, damaged, or modified.

If the first verification of operations 630 and 635 is successful, the second verification can be performed.

The processor selects the initial certificate indicated by the certificate selection information to execute the second security verification at operation 632.

The processor un-signs the electronic signature using the public key included in the initial certificate selected at operation 632 and acquires the initial hash value stored in association with the boot image by decoding the electronic signature at operation 640.

The processor may calculate the hash value at the current time in association with the boot image stored in the boot image storage region of the first memory at operation 642.

The processor compares the initial hash value acquired at operation 640 and the current hash value calculated at operation 642 to determine whether the hash values match each other at operation 650. If the hash values do not match at operation 650, the processor determines that the boot image stored in the boot image storage region of the first memory has been altered and terminates the booting process of the electronic device at operation 642. Otherwise, if the hash values match each other at operation 650, the processor determines that the boot image has not been altered and verifies the integrity of the boot image successfully at operation 660. Once the integrity of the boot image is verified, the process can continue the booting process of the electronic device.

Depending on the implementation, it may be checked whether the user identity information field (EID) recorded in the second storage matches the user identifier field (EID) included in the authentication organization certificate or the boot image certificate.

A description is made of a method for changing a secure root according to an embodiment of the present disclosure hereinafter.

Figure 7:
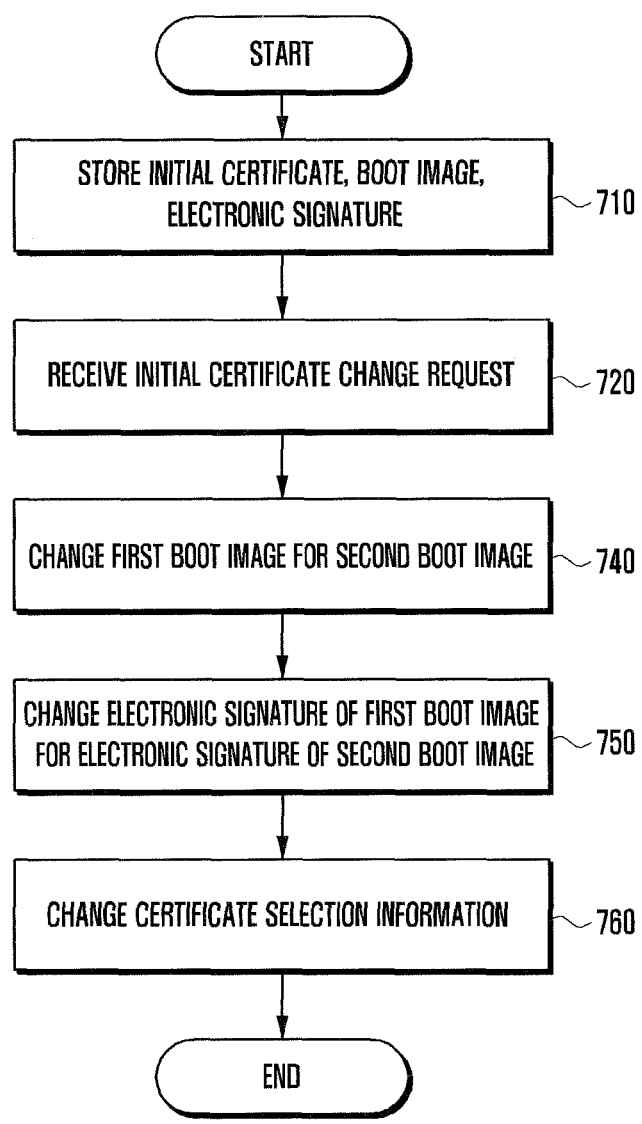
FIG. 7 is a flowchart illustrating a method for changing a secure root according to an embodiment of the present disclosure.

FIG. 7 is a flowchart illustrating a method for changing a secure root according to an embodiment of the present disclosure.

Referring to FIG. 7, at least one boot loader including at least one of an initial certificate storage region, a boot image, and an electronic signature is stored in the electronic device at operation 710. The electronic device may be owned by the orderer/purchaser or the manufacturer/provider.

The electronic device may receive the request for switching the initial certificate from the first initial certificate to the second initial certificate at operation 720. Next, the electronic device changes the first boot image stored at operation 710 for the second boot image at operation 740. The second boot image can be received from outside through physical connection or wired/wireless interface or loaded from the storage of the electronic device.

Depending on the implementation, the first and second boot images may be configured to activate different function groups. For example, the first boot image may be configured for activating all functions of the electronic device while the second boot image is configured to activate all the function of the electronic device with the exception of the camera function.

Depending on the implementation, the first and second boot image may be identical with or different from each other and, if the first and second boot images are identical with each other, operation 740 for changing the boot image may be skipped.

The electronic device changes the electronic signature of the first boot image for the electronic signature of the second boot image at operation 750. At this time, the electronic signature of the second boot image can be generated by signing the original version or contracted version (e.g. hash value) of the second boot image with the private key corresponding to the public key of the second initial certificate.

The electronic signature of the second boot image can be received from outside through a physical connection or a wired/wireless interface or loaded from the storage of the electronic device.

The electronic device changes the certificate selection information stored in the second memory of the chipset at operation 760.

Depending on the implementation, if the certificate selection information is included in a certain region (e.g. header) of the boot loader, the corresponding certificate selection information may be changed.

Although this embodiment is directed to the case where the procedure is performed in the order of operations 740, 750, and 760, these operation operations may be performed in different execution order, simultaneously in part, or with additional operations.

Figure 8:
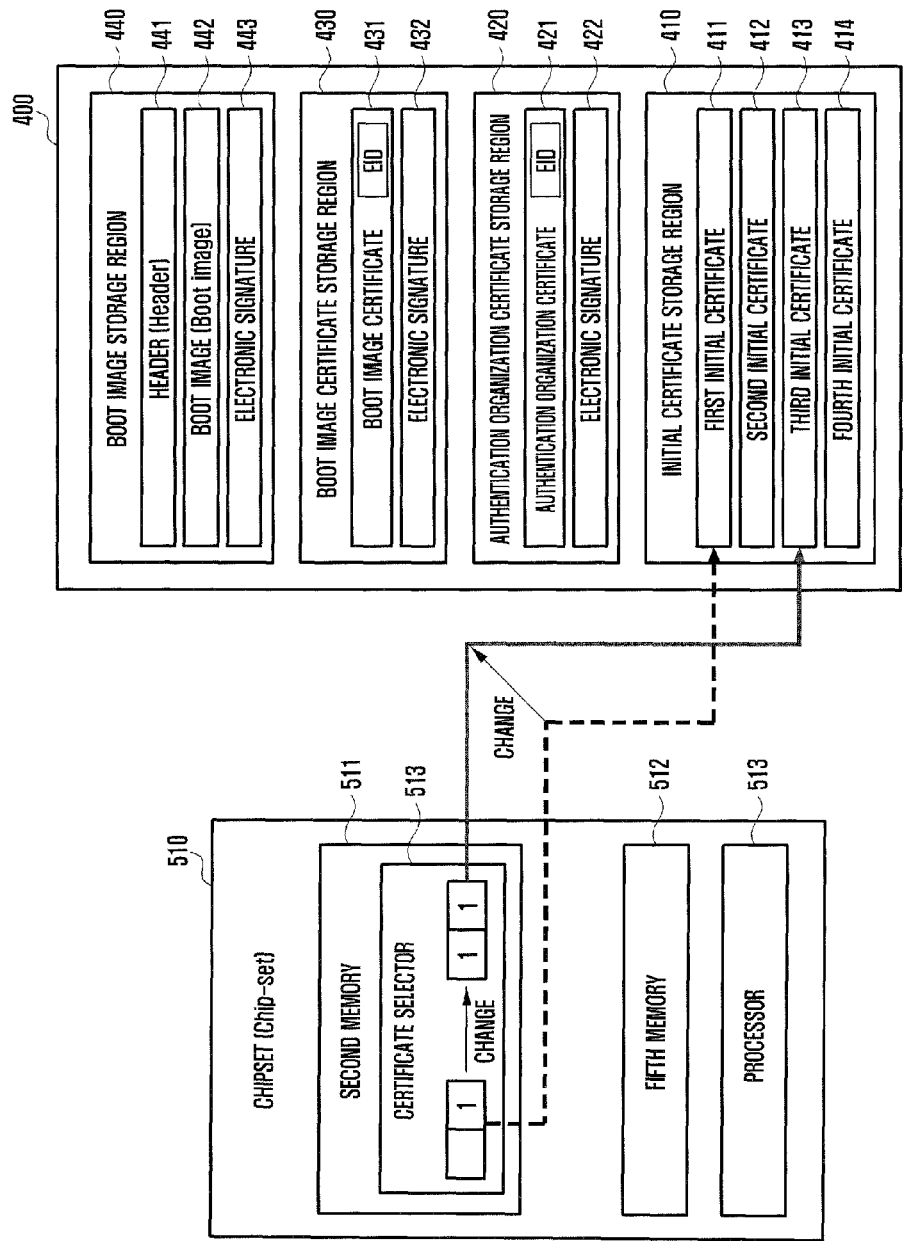
FIG. 8 is a block diagram illustrating an operation of changing certificate selection information of an electronic device according to an embodiment of the present disclosure.

FIG. 8 is a block diagram illustrating an operation of changing a certificate selection information of an electronic device according to an embodiment of the present disclosure.

Referring to FIG. 8, the certificate selection information comprises of plural bits of which the most right bit is set to 0 (non-fused state) or 1 (fused state) (e.g. 0b00 or 0b01) to indicate the memory address information at which the first certificate is stored. The certificate selection information may be set to a default value of the certificate selector of the second memory. Afterward, if a request is made for changing the initial certificate for the third initial certificate, the default value of the certificate selector 531 is changed to indicate the address information at which the third initial certificate is stored.

For example, if the certificate selection information is set to 0b01 as the value indicated by the address information of the first initial certificate, the second most right bit of the certificate selection information is set to 1 to change the certificate selection information to 0b11 as the address information of the third initial certificate so as to change the initial certificate from the first initial certificate to the third initial certificate.

Figure 9:
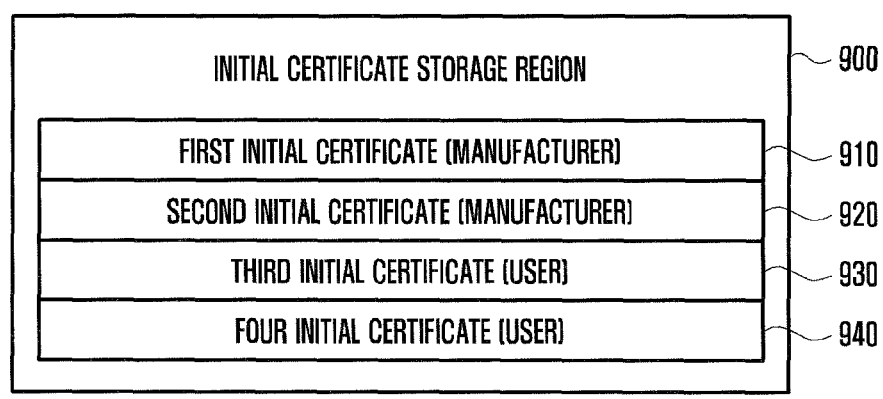
FIG. 9 is a diagram illustrating an initial certificate storage region according to an embodiment of the present disclosure.

FIG. 9 is a diagram illustrating an initial certificate storage region according to an embodiment of the present disclosure.

Referring to FIG. 9, the initial certificate storage region 900 includes a manufacturer's first initial certificate 910, a manufacturer's second initial certificate 920, a user's (purchaser's) third initial certificate 930, and a user's (purchaser's) fourth certificate 940. The first and second initial certificates 910 and 920 may include the first and second public keys of the manufacturer respectively, the first and second public keys may identical with or different from each other.

The first and second initial certificates 910 and 920 may correspond to different boot loaders.

For example, the boot loader corresponding to the first initial certificate 910 may include a code configured to verify, when the kernel is loaded on the volatile memory for execution, the kernel based on the first initial certificate 910.

The boot loader corresponding to the second initial certificate 920 may include the code configured to skip, when the kernel is loaded on the volatile memory for execution, verification on the kernel.

The user of the third initial certificate 930 and the third initial certificate 940 may include a B2B client (e.g. Enterprise Customer) and a B2G client (the Ministry of Defense, National Security Agency, GTC, etc.), and the user of the third initial certificate 930 and the fourth initial certificate 940 may identical with or different from each other.

Here, the initial certificate storage region 900 stores the first and second public keys of the manufacturer and the third and fourth public keys of the user (or purchaser) but not limited thereto.

In the storage medium (recording medium) storing the commands of the method according to an embodiment of the present disclosure, the commands may be designed to perform at least one operation when they are executed by at least one processor.

The above operations may include storing plural initial certificates including the first and second initial certificates, storing the certificate selection value indicating the initial certificate selected among the first and second certificate, and switching the initial certificate from the first initial certificate to the second authentication means. The operation of the storage medium can be more clarified by referencing the above description.

According to an embodiment of the present disclosure, the initial certificates of the candidate purchaser and manufacturer are all stored in the electronic device such that one of the initial certificates is selected in response to the trust root switch request to change the trust root.

The initial certificate can be selected at the product manufacturing stage or after the product has been provided thus that the initial certificate can be selected or changed according to the intention of the orderer.

When the boot loaders and boot images corresponding to the plural initial certificates are configured to support different functions or security levels, the electronic device can be used for distinct functions or at different security levels by changing the initial certificate whenever necessary.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a first memory configured to store a plurality of initial certificates comprising a first initial certificate and a second initial certificate, each initial certificate being configured to be a first certificate used to verify a boot image of the electronic device;
    a second memory configured to store a certificate selection information indicating an initial certificate selected among the first and second initial certificates;
    a third memory configured to store instructions; and
    at least one processor,
    wherein, upon execution of the instructions, the at least one processor is configured to:
        verify the first initial certificate using a first trusted root,
        verify the boot image of the electronic device using the first initial certificate as the first certificate used to verify the boot image for a boot of the electronic device,
        enable, by the first initial certificate, a first security level for the electronic device,
        boot the electronic device by the boot image verified by the first initial certificate,
        receive an indication to switch certificates from the first initial certificate to the second initial certificate,
        verify the second initial certificate using a second trusted root,
        verify the boot image of the electronic device using the second initial certificate to as the first certificate used to verify the boot image for a subsequent boot of the electronic device,
        enable, by the second initial certificate, a second security level for the electronic device, and
        subsequently boot the electronic device by the boot image verified using the second initial certificate as the first certificate used to verify the boot image for the subsequent boot, and
    wherein the first and second security levels are different security levels, and the first and second trusted roots are different trusted roots.

2. The electronic device of claim 1, wherein the indication to switch certificates is received after the electronic device is sold.

3. The electronic device of claim 1, wherein the second memory comprises a memory programmable at least once.

4. The electronic device of claim 1, wherein the first initial certificate comprises a public key of a manufacturer of the electronic device, and the second initial certificate comprises a public key of a user.

5. The electronic device of claim 1, wherein the first initial certificate comprises a first public key of a manufacturer of the electronic device, and the second initial certificate comprises a second public key of the manufacturer.

6. The electronic device of claim 1, wherein the at least one processor is further configured to check an electronic signature corresponding to a binary code of at least a part of the boot image according to the certificate selection information.

7. The electronic device of claim 6,
wherein the at least one processor is further configured to execute the binary code, and
wherein the binary code has been verified successfully according to a result of the checking of the electronic signature.

8. The electronic device of claim 6,
wherein the at least one processor is further configured to execute the binary code, and
wherein the binary code failed in verification according to a result of the checking of the electronic signature.

9. The electronic device of claim 1, wherein the at least one processor is further configured to:
store an electronic signature generated by signing one of original or contracted versions of the boot image with a private key corresponding to a public key of the second initial certificate, and
verify the electronic signature based on the second initial certificate.

10. The electronic device of claim 9, wherein the at least one processor is further configured to verify the electronic signature based on the public key.

11. The electronic device of claim 1,
wherein the second memory is further configured to store user identity information, and
wherein the at least one processor is further configured to verify the boot image based on at least one of the second initial certificate or the user identity information.

12. The electronic device of claim 1, wherein the at least one processor is further configured to verify the boot image using the second initial certificate based on information recorded at a part of the boot image.

13. The electronic device of claim 1, wherein the part of the boot image comprises a header of the boot image.

14. The electronic device of claim 1, further comprising at least one interface configured to receive the indication to switch certificates from outside of the electronic device.

15. The electronic device of claim 1, wherein the at least one processor is further configured to activate:
when the boot image is verified based on the first initial certificate, a first function group of the electronic device, and
when the boot image is verified based on the second initial certificate, a second function group of the electronic device.

16. The electronic device of claim 1, wherein the at least one processor is further configured to switch, when the first initial certificate is switched to the second initial certificate, the boot image from a first boot image corresponding to the first initial certificate to a second boot image corresponding to the second initial certificate.

* * * * *